(No Model.)
D. A. S. MACKINTOSH.
MUG FOR MEASURING BEER.
No. 492,816. Patented Mar. 7, 1893.
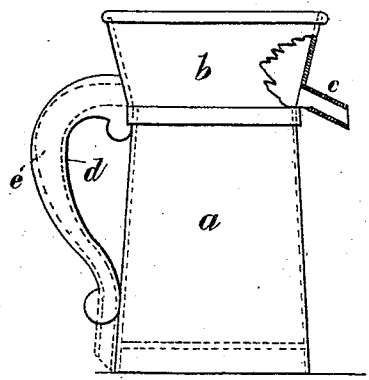
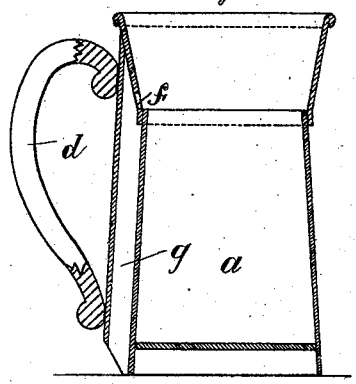
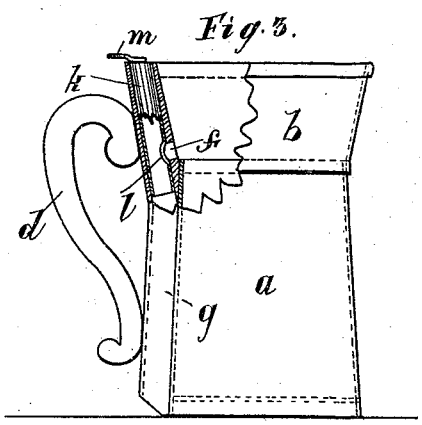
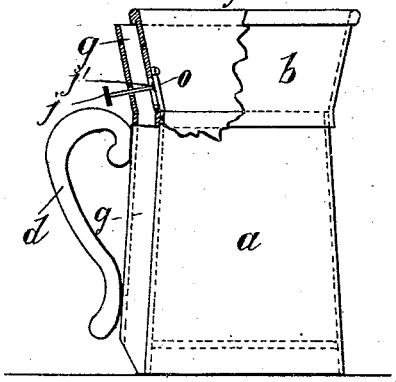
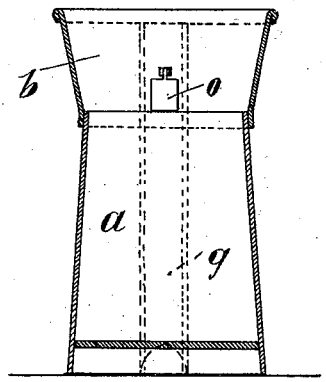
Witnesses:
E. K. Sturtevant
A. J. Underhill
Inventor:
Donald A. S. Mackintosh
by Richardson
attys.

UNITED STATES PATENT OFFICE.

DONALD A. S. MACKINTOSH, OF GLASGOW, SCOTLAND.

MUG FOR MEASURING BEER.

SPECIFICATION forming part of Letters Patent No. 492,816, dated March 7, 1893.

Application filed August 29, 1891. Serial No. 404,164. (No model.) Patented in England January 29, 1891, No. 1,635.

*To all whom it may concern:*

Be it known that I, DONALD ARCHIBALD SINCLAIR MACKINTOSH, a subject of the Queen of Great Britain, and a resident of Springburn, near the city of Glasgow, Lanarkshire, Scotland, have invented certain new and useful Improvements in Vessels for Measuring Liquids, of which the following is a specification.

This invention relates to vessels or measures for measuring out beer, ale, and other liquors.

When using the beer measures, as heretofore made, the barman is either in the habit of blowing on the beer in order to ascertain if the required quantity is being supplied to the customers, or, he perhaps, gives an extra pull of the pump, so as to supply sufficient liquid to compensate for the froth. In the former case, the blowing is very objectionable, as, if the barman is suffering from disease, he is very apt to communicate contamination to the liquid and so to the customer, and, in the latter case, by constantly giving a small extra supply, the profits accruing from the sale of the liquor, are either entirely lost or seriously diminished.

This invention has for its object to provide a simple construction of measuring vessel, in the use of which it will not be necessary to either blow on the liquid or give an extra supply. In effecting this object the vessel is so made that a little liquor trickles from it as soon as it is full and thus indicates to the barman that the supply is to be cut off.

The invention may be carried out in various ways, but, by way of illustration, I have appended two explanatory sheets of drawings, showing methods of construction.

On the drawings:—Figure 1, shows in part side elevation one form of my improved measure. Fig. 2 shows, in section, a different form; and Figs. 3, and 4, show, in part side elevation, other forms of the measure. Fig. 5 is a vertical section of the measure Fig. 4.

Referring to the drawings whereon the same reference letters wherever repeated indicate similar or like parts. The measure $a$, Fig. 1, is of the ordinary construction save that it has an enlarged rim $b$ fitted on top so as to contain the froth and at the lower edge of the rim $b$, and just above the top of the measure $a$ proper, there is fitted a spout $c$ through which any excess of liquor will flow and immediately indicate to the barman or attendant that the vessel is full, without necessitating the blowing away of froth. Instead of having a spout $c$ the handle $d$ may be made hollow, as indicated in dotted lines at $e$, so that any excess of liquor can run off by the channel and indicate to the barman that the measure is full.

In Fig. 2, the measure is very similar to Fig. 1, except that instead of using a hollow handle or spout, the excess of liquor escapes through a hole $f$ and into a tube $g$ fitted to the outside.

In Fig. 3, the vessel has a tube $k$ with a hole $l$ in it for opening and closing the orifice $f$ in the vessel. The tube $k$ can be turned round, by the handle $m$, within the tube $g$, so as to open and close the passage from the interior of the vessel to the tube $g$.

In Fig. 4 I have shown a hinged valve $o$ closing the opening $f$, leading to the tube $g$. The door $o$ is made sufficiently heavy as to close by its own weight. The spindle or rod $j$ is hinged or jointed to the door at $j'$. Fig. 5 shows a view of the door, in its closed position, looking from the interior of the vessel. The discharge tube $g$ is upon the outside of the vessel and extends down to the lower edge where one side or edge of the tube is cut off at an angle, as shown, so that the drippings can be easily seen, and they will not be confined by the tube in case the receptacle is resting upon a flat surface.

With a vessel having these improvements, immediately the liquid rises slightly above the proper height, it overflows down or into the passageway, tube, or equivalent. The supply of beer or other liquid is then immediately cut off. The drippings or overflow may be collected in a pan or tray or in another vessel over which the measure is held, when being filled.

With my invention the exact quantity of liquid is always given to customers, no blowing off of froth is necessary and no loss results from over supply.

Having now fully described my invention, what I claim, and desire to secure by Letters Patent, is—

1. A vessel for liquids and an overflow tube therefor on the outside of the vessel extending to the bottom thereof and having its end formed inclined, substantially as described.

2. A vessel for liquids, consisting of a vessel proper, a handle and an overflow tube extending through the handle, substantially as described.

In witness whereof I have hereunto set my hand in presence of two witnesses.

D. A. S. MACKINTOSH.

Witnesses:
HUGH FITZPATRICK,
DUNCAN DEWAR, Junr.